(12) United States Patent
Jaygarl et al.

(10) Patent No.: US 11,899,897 B2
(45) Date of Patent: Feb. 13, 2024

(54) METHOD FOR CONTROLLING APPLICATION OF EXTERNAL ELECTRONIC DEVICE AND ELECTRONIC DEVICE SUPPORTING SAME

(71) Applicant: SAMSUNG ELECTRONICS CO., LTD., Suwon-si (KR)

(72) Inventors: Hojun Jaygarl, Suwon-si (KR); Kihoon Nam, Suwon-si (KR); Seungseok Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/903,363

(22) Filed: Sep. 6, 2022

(65) Prior Publication Data

US 2022/0417317 A1    Dec. 29, 2022

Related U.S. Application Data

(63) Continuation of application No. PCT/KR2021/002247, filed on Feb. 23, 2021.

(30) Foreign Application Priority Data

Mar. 5, 2020 (KR) .................. 10-2020-0027944

(51) Int. Cl.
*G06F 3/0481* (2022.01)
*G06F 3/04817* (2022.01)
*H04L 67/025* (2022.01)

(52) U.S. Cl.
CPC ........ *G06F 3/0481* (2013.01); *G06F 3/04817* (2013.01); *H04L 67/025* (2013.01)

(58) Field of Classification Search
CPC .............. H04L 67/025; G06F 3/04817; G06F 15/17337; G06F 3/0481
See application file for complete search history.

(56) References Cited

U.S. PATENT DOCUMENTS 9,535,567 B1 *  1/2017  Bagrinovskiy ..... G06F 3/04845
10,282,316 B2 *  5/2019  Onohara ........... H04M 1/72415
(Continued)

FOREIGN PATENT DOCUMENTS

KR        10-1017866       3/2011
KR    10-2015-0026109      3/2015
(Continued)

OTHER PUBLICATIONS

International Search Report for PCT/KR2021/002247, dated Jun. 14, 2021, 4 pages.

*Primary Examiner* — Mong-Shune Chung
(74) *Attorney, Agent, or Firm* — NIXON & VANDERHYE P.C.

(57) ABSTRACT

An electronic device may include a display, a communication circuit, a processor operatively connected to the display and the communication circuit, and a memory operatively connected to the processor, wherein the memory may store instructions which, when executed, cause the processor to: receive information relating to at least one application installed in an external electronic device from the external electronic device through the communication circuit; configure, on the basis of the received information, the at least one application as a remote control application controlled by the electronic device; receive a notification message related to the remote control application from the external electronic device through the communication circuit; and display, on the display, a first object indicating reception of the notification message. Various other embodiments are also possible.

20 Claims, 12 Drawing Sheets

(56) References Cited

U.S. PATENT DOCUMENTS

| | | | |
|---|---|---|---|
| 10,469,894 | B1 | 11/2019 | Danciu et al. |
| 10,664,772 | B1* | 5/2020 | Poel .................... G06F 3/04842 |
| 10,924,528 | B1* | 2/2021 | Korobov ............... G06F 16/178 |
| 2012/0060109 | A1 | 3/2012 | Han et al. |
| 2013/0135323 | A1* | 5/2013 | Cheon .................. G06F 3/0485 |
| | | | 345/501 |
| 2014/0351434 | A1 | 11/2014 | Kim et al. |
| 2015/0065056 | A1 | 3/2015 | Won et al. |
| 2015/0180952 | A1 | 6/2015 | Yang |
| 2016/0080475 | A1 | 3/2016 | Singh et al. |
| 2016/0260408 | A1 | 9/2016 | Chen et al. |
| 2016/0360339 | A1* | 12/2016 | Yuan .................... H04L 67/125 |
| 2019/0334849 | A1* | 10/2019 | Bostick ............... H04L 12/1895 |
| 2021/0181853 | A1* | 6/2021 | Hassan ............... G06F 3/04817 |

FOREIGN PATENT DOCUMENTS

| | | |
|---|---|---|
| KR | 10-2015-0055158 | 5/2015 |
| KR | 10-2015-0056074 | 5/2015 |
| KR | 10-2015-0072766 | 6/2015 |
| KR | 10-2015-0074345 | 7/2015 |
| KR | 10-2015-0087733 | 7/2015 |
| KR | 10-2020-0003356 | 1/2020 |

* cited by examiner

METHOD FOR CONTROLLING APPLICATION OF EXTERNAL ELECTRONIC DEVICE AND ELECTRONIC DEVICE SUPPORTING SAME

CROSS REFERENCE TO RELATED APPLICATION

This application is a continuation of International Application No. PCT/KR2021/002247 designating the United States, filed on Feb. 23, 2021 in the Korean Intellectual Property Receiving Office and claiming priority to Korean Patent Application No. 10-2020-0027944, filed on Mar. 5, 2020, the disclosures of which are all hereby incorporated herein by reference for all purposes as if fully set forth herein.

TECHNICAL FIELD

Various embodiments of the disclosure relate to a technique for controlling an application of an electronic device such as an external electronic device.

BACKGROUND

In recent years, as mobile communication technology has been developed and a convergence solution has become an issue, development of a technology related to remote control is actively progressing. Remote control refers to, for example, a technology enabling a user to control an external electronic device using an electronic device connected to the external electronic device. To perform remote control, the user may install a remote control program, which is a program for controlling the external electronic device, in the electronic device, and may control the external electronic device through the remote control program.

However, a method of controlling an external electronic device through a remote control program causes an inconvenience that the remote control program installed in an electronic device needs to be executed first in order to control an application installed in the external electronic device. For example, a user of the electronic device may execute the application of the external electronic device by executing the remote control program installed in the electronic device and selecting an icon of the application of the external electronic device provided through an execution screen of the remote control program.

Further, the method of controlling the external electronic device through the remote control program makes it difficult to identify a notification related to the application of the external electronic device in the electronic device even though the notification occurs in a state in which the remote control program is not executed. Accordingly, the user needs to execute the remote control program installed in the electronic device in order to identify the notification related to the application of the external electronic device.

SUMMARY

Various embodiments of the disclosure may provide a method for controlling an application of an external electronic device, based on information about a remotely controllable application, and an electronic device supporting the same.

Further, various embodiments of the disclosure may provide a method for providing a notification related to an application of an external electronic device, based on information about a remotely controllable application, and an electronic device supporting the same.

An electronic device according to various embodiments of the disclosure may include a display, a communication circuit, a processor configured to be operatively connected to the display and the communication circuit, and a memory configured to be operatively connected to the processor, wherein the memory may store instructions which, when executed, cause the processor to receive information about at least one application installed in an external electronic device from the external electronic device through the communication circuit, configure, based at least on the received information, the at least one application as a remote control application to be controlled by the electronic device, receive a notification message related to the remote control application from the external electronic device through the communication circuit, and control to display a first object indicating reception of the notification message on the display.

A method for controlling an application of an external electronic device by an electronic device according to various embodiments of the disclosure may include receiving information about at least one application installed in the external electronic device from the external electronic device through a communication circuit installed in the electronic device, configuring, based at least on the received information, the at least one application as a remote control application to be controlled by the electronic device, receiving a notification message related to the remote control application from the external electronic device through the communication circuit, and displaying a first object indicating reception of the notification message on a display of the electronic device.

According to various embodiments of the disclosure, an application of an external electronic device may be controlled or a notification related to an application of an external electronic device may be provided without executing a separate remote control program, thereby improving usability and convenience of remote control.

In addition, various effects directly or indirectly identified through this document may be provided.

BRIEF DESCRIPTION OF DRAWINGS

The above and other aspects, features, and advantages of certain example embodiments of the present disclosure will be more apparent from the following detailed description, taken in conjunction with the accompanying drawings, in which.

In describing the drawings, the same or like reference numerals may be used to refer to the same or like elements.

DETAILED DESCRIPTION

Figure 1:
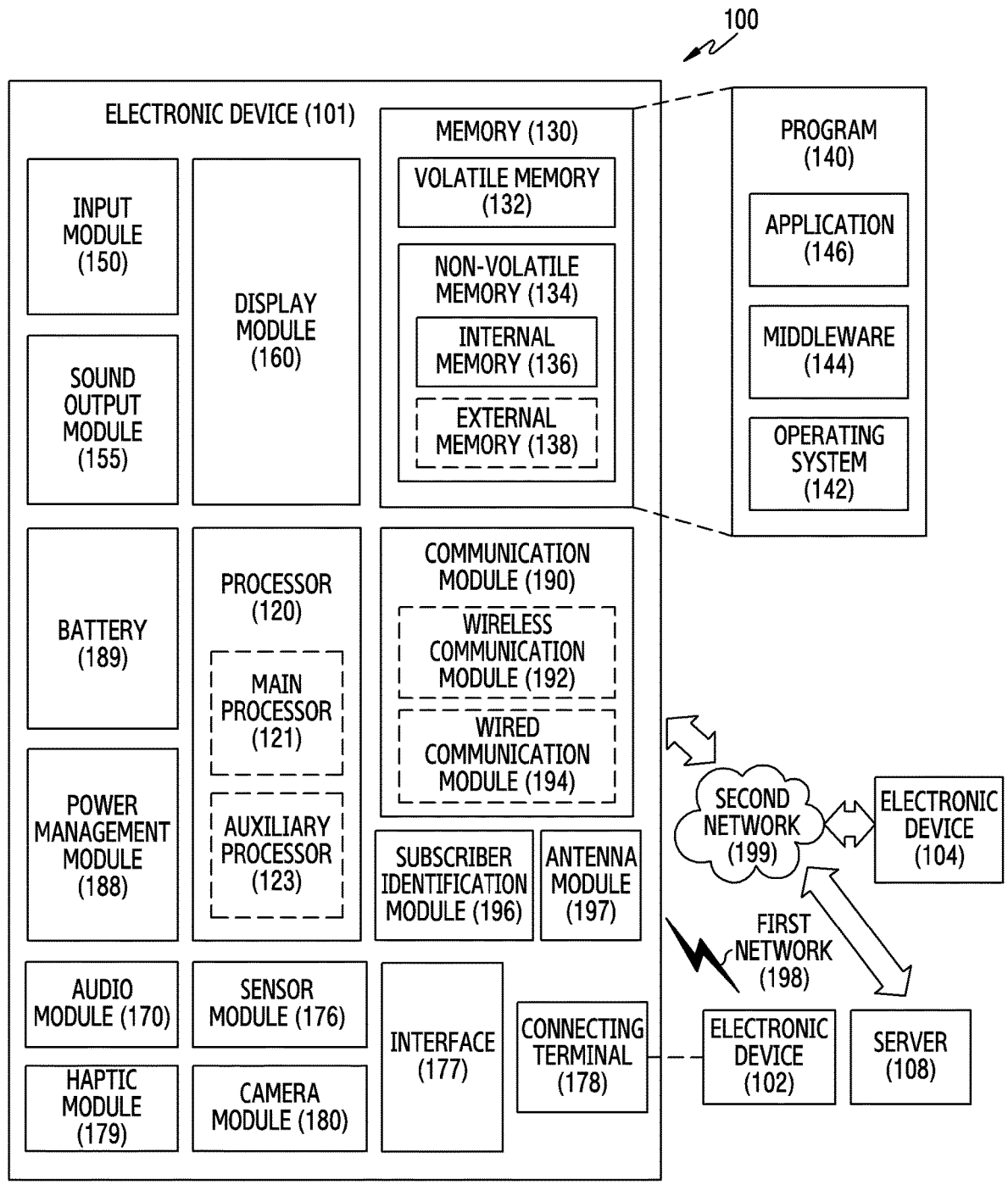
FIG. 1 is a block diagram of an electronic device in a network environment according to various example embodiments.

Hereinafter, various embodiments disclosed herein will be described with reference to the accompanying drawings. For convenience of description, the sizes of components illustrated in the drawings may be exaggerated or reduced, and the disclosure is not necessarily limited to those illustrated.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). Each "module" herein may include circuitry.

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 (including at least one antenna) may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192, including communication circuitry) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
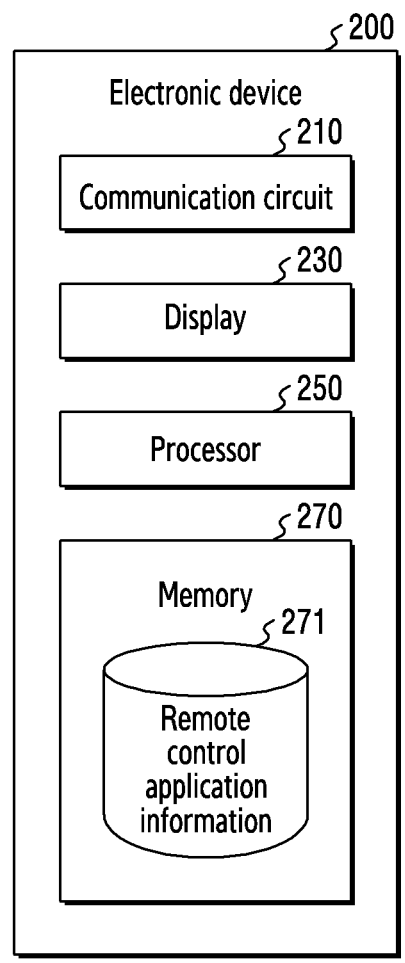
FIG. 2 illustrates an electronic device for controlling an application of an external electronic device according to an example embodiment of the disclosure.

FIG. 2 illustrates an electronic device for controlling an application of an external electronic device according to an embodiment of the disclosure.

An electronic device 200 (e.g., the electronic device 101) may remotely control an application of an external electronic device (e.g., the electronic device 102, the electronic device 104, or the server 108) without executing a separate remote control program. The electronic device 200 may receive information about at least one application installed in the external electronic device from the external electronic device, and may configure the at least one application as a remote control application controllable by the electronic device 200, based on the received information. Further, the electronic device 200 may display an icon of the configured remote control application on a screen. Accordingly, when the icon of the remote control application displayed on the screen is selected, the electronic device 200 may control the remote control application to be executed without executing a separate remote control program. In addition, when a notification related to the remote control application occurs, the electronic device 200 may receive a notification message from the external electronic device, and may display an object indicating reception of the notification message on the screen. Accordingly, the electronic device 200 may provide the notification message related to the remote control application to a user without executing a separate remote control program.

Referring to FIG. 2, the electronic device 200 to perform the foregoing function may include a communication circuit 210, a display 230, a processor 250 (including processing circuitry), and a memory 270. However, the electronic device 200 is not limited to the foregoing configuration. According to various embodiments, the electronic device 200 may omit at least one of the foregoing components, and may further include at least one other component. For example, the electronic device 200 may further include an input device for receiving a user input.

The communication circuit 210 may support communication between the electronic device 200 and the external electronic device. According to an embodiment, the communication circuit 210 may receive the information about the at least one application installed in the external electronic device from the external electronic device. According to another embodiment, the communication circuit 210 may receive data about an execution screen of the application installed in the external electronic device from the external electronic device.

The display 230 may display various types of content (e.g., text, an image, a video, an icon, or a symbol) to the user. The display 230 may include a touchscreen, and may receive, for example, a touch, gesture, proximity, or hovering input using an electronic pen or a body part of the user. According to an embodiment, the display 230 may display the icon of the remote control application. According to another embodiment, the display 230 may display the notification message related to the remote control application and the object indicating the reception of the notification message.

The processor 250 may control at least one other component of the electronic device 200, and may perform various types of data processing or operations. According to an embodiment, the processor 250 may execute an instruction related to remote control. Each processor herein includes processing circuitry.

The processor 250 may configure a remote control application controllable by the electronic device 200 among a plurality of applications installed in the external electronic device. According to an embodiment, the processor 250 may receive the information about the at least one application installed in the external electronic device from the external electronic device through the communication circuit 210, and may configure the at least one application as the remote control application, based on the received information about the at least one application. According to an embodiment, the processor 250 may configure the at least one application as the remote control application, based on a user input received through the input device. For example, the processor 250 may display a list of the at least one application on the display 230, based on the received information about the at least one application, and when receiving a user input to select at least one of an item corresponding to each application from the list, the processor 250 may configure the application corresponding to the selected item as the remote control application.

The processor 250 may store information (hereinafter, referred to as remote control application information 271) about at least one remote control application remotely controllable by the electronic device 200 among the plurality of applications installed in the external electronic device in the memory 270. The remote control application information 271 may include at least one of identification information (e.g., an application name, package information, or manufacturer information) about the remote control application and an icon of the remote control application. The remote control application information 271 may be the same as or similar to the information about the at least one application installed in the external electronic device received from the external electronic device.

When the remote control application is configured, the processor 250 may transmit configuration information about the remote control application to the external electronic device through the communication circuit 210. Accordingly, the external electronic device may identify the application remotely controllable by the electronic device 200 among the plurality of applications installed in the external electronic device. The configuration information of the remote control application may include the identification information (e.g., the application name, the package information, or the manufacturer information) about the remote control application.

According to an embodiment, the processor 250 may transmit information indicating whether to receive the notification message related to the remote control application to the external electronic device through the communication circuit 210. Accordingly, when a notification related to an application corresponding to the remote control application of which the notification message is configured to be received among the plurality of applications installed in the external electronic device occurs, the external electronic device may transmit the notification message to the electronic device 200. In this case, the electronic device 200 may display at least one of the received notification message and the object indicating the reception of the notification message on the display 230. However, a method for receiving the notification message is not limited to the foregoing example. According to an embodiment, the processor 250 may receive the notification message only by transmitting the configuration information about the remote control application to the external electronic device, without transmitting the information indicating whether to receive the notification message. The information indicating whether to receive the notification message may include the identification information about the remote control application of which the notification message is configured to be received and information indicating approval/rejection of reception.

According to an embodiment, the processor 250 may configure the information indicating whether to receive the notification message related to the remote control application, based on a user input received through the input device. For example, the processor 250 may display a list of the remote control application on the display 230, and when receiving a user input to select at least one of an item corresponding to each remote control application from the list, the processor 250 may configure the remote control application corresponding to the selected item as an application of which the notification message is received.

The processor 250 may display the icon of the remote control application on the display 230. According to an embodiment, the processor 250 may display the icon of the remote control application on the display 230, based on the remote control application information 271.

According to an embodiment, the processor 250 may display the icon of the remote control application to be distinguished from an icon of an application installed in the electronic device 200. For example, the processor 250 may divide the screen of the display 230 into an area displaying the icon of the remote control application and an area displaying the icon of the application installed in the electronic device 200. In another example, the processor 250 may configure a value indicating a graphic property of the icon of the remote control application to be different from a value indicating a graphic property of the icon of the application installed in the electronic device 200. The graphic property may include, for example, at least one of an icon color, a background color, a border shape, a border thickness, or a border color. In still another example, the processor 250 may display an object (e.g., a badge) indicating the remote control application to be added to (or overlap) the icon of the remote control application.

When receiving the notification message related to the remote control application, the processor 250 may display the object indicating the reception of the notification message on the display 230. According to an embodiment, the processor 250 may display the object (e.g., a quick view) indicating the reception of the notification message in a designated area (e.g., an upper area) of the display 230. The quick view object may include content of the notification message. According to another embodiment, the processor 250 may display object (e.g., a badge) indicating the reception of the notification message to be added to (or overlap) the icon of the remote control application. The badge object may include information about the number of notification messages which the user has not checked among the notification messages.

When receiving a request for execution of the remote control application, the processor 250 may transmit a request for execution of the application corresponding to the remote control application among the plurality of applications installed in the external electronic device to the external electronic device through the communication circuit 210. For example, when receiving a user input to select the remote control application displayed on the display 230, the processor 250 may determine that a request for execution of the remote control application has occurred. Here, the processor 250 may identify the external electronic device in which the application corresponding to the remote control application is installed, based on the remote control application information 271 stored in the memory 270, and may transmit the request for the execution of the application corresponding to the remote control application to the identified external electronic device. In this case, the external electronic device may execute the application corresponding to the remote control application among the plurality of applications installed in the external electronic device in response to the request for the execution, and may transmit data about an execution screen of the application to the electronic device.

When receiving the data about the execution screen of the application through the communication circuit 210, the processor 250 may display the execution screen of the application on the display 230, based on the received data. According to an embodiment, the processor 250 may change and display the execution screen of the application according to a graphic property of the display 230 (e.g., the resolution or size of the display 230), based on the received data.

When a touch input occurs on the display 230 with the execution screen of the application displayed on the display 230, the processor 250 may transmit touch information corresponding to the touch input to the external electronic device through the communication circuit 210. According to an embodiment, the processor 250 may change a touch coordinate included in the touch information, based on a graphic property of a display included in the external electronic device (e.g., the resolution or size of the display included in the external electronic device), and may transmit the touch coordinate to the external electronic device. For example, the processor 250 may revise the touch input occurring on the display 230 as if occurring on the display of the external electronic device, thereby transmitting the touch input.

The memory 270 may store various types of data used by at least one component of the electronic device 200. According to an embodiment, the memory 270 may store an instruction and data related to remote control. The instruction may cause the processor 250 to perform a function corresponding to the instruction, that is, a function related to remote control, when executed by the processor 250. According to another embodiment, the memory 270 may store at least one application capable of performing various functions, installed in the electronic device 200. According to still another embodiment, the memory 270 may store the remote control application information 271.

As described above, according to various embodiments, an electronic device (e.g., the electronic device 200) may include a display (e.g., the display 230), a communication circuit (e.g., the communication circuit 210), a processor (e.g., the processor 250) operatively connected to the display and the communication circuit, and a memory (e.g., the memory 270) operatively connected to the processor, wherein the memory may store instructions which, when executed, cause the processor to receive information about at least one application installed in an external electronic device from the external electronic device through the communication circuit, configure, based at least on the received information, the at least one application as a remote control application to be controlled by the electronic device, receive a notification message related to the remote control application from the external electronic device through the communication circuit, and control to display a first object indicating reception of the notification message on the display.

According to various embodiments, the instructions may cause the processor to control to display an icon of the remote control application on the display, based at least on the received information.

According to various embodiments, the instructions may cause the processor to control to display, on the display, the icon of the remote control application to be distinguished from an icon of an application installed in the electronic device.

According to various embodiments, the instructions may cause the processor to control to display, on the display, a second object indicating the remote control application to be added to the icon of the remote control application.

According to various embodiments, the instructions may cause the processor to control to display, on the display, the first object to be added to the icon of the remote control application.

According to various embodiments, the electronic device may further include an input device comprising input circuitry, wherein the instructions may cause the processor to configure the at least one application as the remote control application, based at least on a user input received through the input device.

According to various embodiments, the instructions may cause the processor to control to transmit configuration information about the remote control application to the external electronic device through the communication circuit when the remote control application is configured based on the user input.

According to various embodiments, the instructions may cause the processor to control to transmit a request for execution of an application corresponding to the remote control application among a plurality of applications installed in the external electronic device to the external electronic device through the communication circuit based on at least receiving a request for execution of the remote control application.

According to various embodiments, the instructions may cause the processor to receive data about an execution screen of the application corresponding to the remote control application from the external electronic device through the communication circuit, and control to display the execution screen of the application, based on the received data.

According to various embodiments, the instructions may cause the processor to change a touch coordinate included in touch information corresponding to a touch input, based at least on a graphic property of a display included in the external electronic device when the touch input occurs on the display of the electronic device, and control to transmit the touch information including the changed touch coordinate to the external electronic device through the communication circuit.

Figure 3:
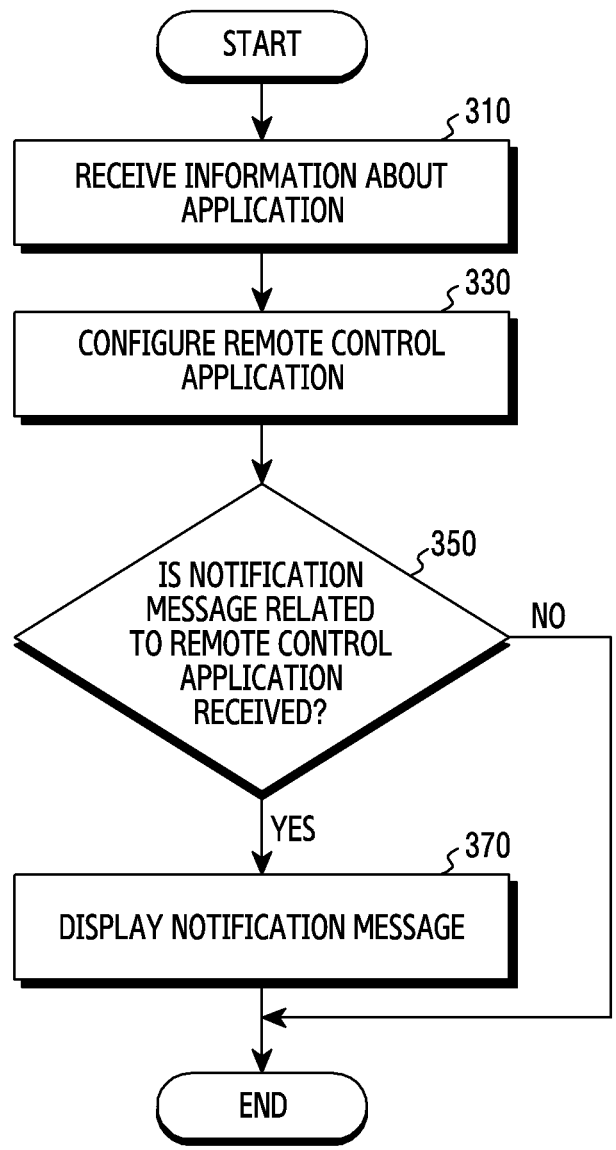
FIG. 3 illustrates an operating method of an electronic device for controlling an application of an external electronic device according to an example embodiment of the disclosure.

FIG. 3 illustrates an operating method of an electronic device for controlling an application of an external electronic device according to an embodiment of the disclosure.

Referring to FIG. 3, in operation 310, a processor (e.g., the processor 250) of an electronic device (e.g., the electronic device 200) may receive information about at least one application installed in an external electronic device from the external electronic device through a communication circuit (e.g., the communication circuit 210). Here, the at least one application installed in the external electronic device may be an application remotely controllable by the electronic device. The electronic device and the external electronic device may be electronic devices controlled by the same user. For example, the electronic device and the external electronic device may be electronic devices controlled through the same user account.

In operation 330, the processor may configure a remote control application remotely controllable by the electronic device among a plurality of applications installed in the external electronic device. For example, the processor may configure the at least one application as the remote control application, based on the received information about the at least one application. According to an embodiment, the processor may configure the at least one application as the remote control application, based on a user input received through an input device included in the electronic device. For example, the processor may display a list of the at least one application on a display (e.g., the display 230), based on the received information about the at least one application, and when receiving a user input to select at least one of an item corresponding to each application from the list, the processor 250 may configure the application corresponding to the selected item as the remote control application.

According to an embodiment, when the remote control application is configured, the processor may store information about the remote control application (e.g., the remote control application information 271) in a memory (e.g., the memory 270). The information about the remote control application may include at least one of identification information (e.g., an application name, package information, or manufacturer information) about the remote control application and an icon of the remote control application. The remote control application information may be the same as or similar to the information about the at least one application installed in the external electronic device received from the external electronic device.

According to an embodiment, when the remote control application is configured, the processor may transmit configuration information about the remote control application to the external electronic device through the communication circuit. Accordingly, the external electronic device may identify the application remotely controllable by the electronic device among the plurality of applications installed in the external electronic device. The configuration information of the remote control application may include the identification information (e.g., the application name, the package information, or the manufacturer information) about the remote control application.

According to an embodiment, when the remote control application is configured, the processor may display an icon of the remote control application on the display. The processor may display the icon of the remote control application on the display, based on the information about the remote control application. The icon of the remote control application may be displayed to be distinguished from other applications installed in the electronic device. For example, the processor may divide the screen of the display into an area displaying the icon of the remote control application and an area displaying an icon of a different application installed in the electronic device. In another example, the processor may configure a value indicating a graphic property of the icon of the remote control application to be different from a value indicating a graphic property of the icon of the different application installed in the electronic device. The graphic property may include, for example, at least one of an icon color, a background color, a border shape, a border thickness, or a border color. In another example, the processor may display an object (e.g., a badge) indicating the remote control application to be added to (or overlap) the icon of the remote control application.

In operation 350, the processor may determine whether a notification message related to the remote control application is received. For example, when a notification related to an application corresponding to the remote control application of which the notification message is configured to be received among the plurality of applications installed in the external electronic device occurs, the external electronic device may transmit the notification message to the electronic device. Here, the processor may receive the notification message through the communication circuit.

According to an embodiment, the processor may transmit information indicating whether to receive the notification message related to the remote control application to the external electronic device through the communication circuit. Accordingly, when the notification related to the application corresponding to the remote control application of which the notification message is configured to be received among the plurality of applications installed in the external electronic device occurs, the external electronic device may transmit the notification message to the electronic device. The information indicating whether to receive the notification message may include the identification information about the remote control application of which the notification message is configured to be received and information indicating approval/rejection of reception.

According to an embodiment, the processor may configure the information indicating whether to receive the notification message related to the remote control application, based on a user input received through the input device. For example, the processor may display a list of the remote control application on the display, and when receiving a user input to select at least one of an item corresponding to each remote control application from the list, the processor may configure the remote control application corresponding to the selected item as an application of which the notification message is received.

When the notification message related to the remote control application is received, the processor may display the notification message on the display in operation 370. According to an embodiment, the processor may display an object indicating reception of the notification message on the display. For example, the processor may display the object (e.g., a quick view) indicating the reception of the notification message in a designated area (e.g., an upper area) of the display. The quick view object may include content of the notification message. According to another example, the processor may display the object (e.g., a badge) indicating the reception of the notification message to be added to (or overlap) the icon of the remote control application. The badge object may include information about the number of notification messages which the user has not checked among the notification messages.

When the notification message related to the remote control application is not received, the processor may terminate a process related to the operations illustrated in FIG. 3. Here, the processor may maintain a state of displaying the icon of the remote control application on the display. Further, the processor may maintain a state for receiving the notification message related to the remote control application. For example, the processor may perform operation 350 repeatedly or at a specified time interval. Accordingly, when the notification message is received, the processor may perform operation 370.

Figure 4:
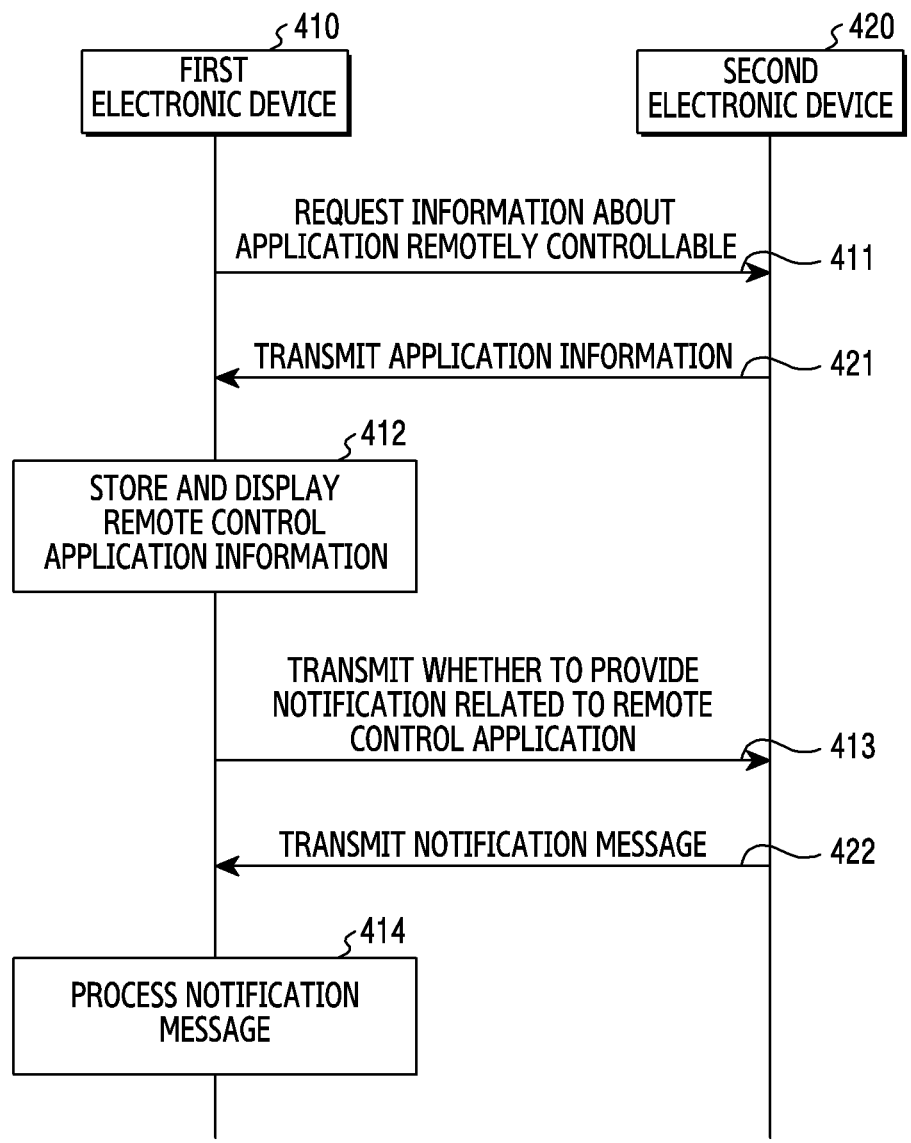
FIG. 4 illustrates a method for providing a notification related to an application of an external electronic device according to an example embodiment of the disclosure.

FIG. 4 illustrates a method for providing a notification related to an application of an external electronic device according to an embodiment of the disclosure.

Referring to FIG. 4, in operation 411, a first electronic device 410 (e.g., the electronic device 200) may request information about a remotely controllable application from a second electronic device 420. According to an embodiment, the first electronic device 410 may request, from the second electronic device 420, information about an application remotely controllable by the first electronic device 410 among a plurality of applications installed in the second electronic device 420, based on a user input.

In operation 421, the second electronic device 420 may transmit information about at least one application remotely controllable by an external electronic device (e.g., the first electronic device 410) among the plurality of applications installed in the second electronic device 420 to the first electronic device 410. The information about the application may include, for example, at least one of identification information (e.g., an application name, package information, or manufacturer information) about the application and an icon of the application.

Upon receiving the information about the application, the first electronic device 410 may store and display information about a remote control application remotely controllable by the first electronic device 410 in operation 412. The first electronic device 410 may configure a remote control application remotely controllable by the first electronic device 410 among the plurality of applications installed in the second electronic device 420, based on the information about the application. Subsequently, the first electronic device 410 may store information about the configured remote control application (e.g., the remote control application information 271) in a memory (e.g., the memory 270). Here, the information about the configured remote control application may be the same as or similar to the information about the application received from the second electronic device 420. Further, the first electronic device 410 may display an icon of the configured remote control application on a display (e.g., the display 230).

In operation 413, the first electronic device 410 may transmit whether to provide a notification related to the remote control application (or whether to receive a notification message) to the second electronic device 420. For example, when a notification related to the application corresponding to the remote control application among the plurality of applications installed in the second electronic device 420 occurs, the first electronic device 410 may transmit whether the first electronic device 410 provides the notification to the second electronic device 420. According to an embodiment, the first electronic device 410 may configure whether to provide the notification related to the remote control application, based on a user input received through an input device. For example, the first electronic device 410 may display a list of the remote control application on the display, and when receiving a user input to select at least one of an item corresponding to each remote control application from the list, the first electronic device 410 may configure the remote control application corresponding to the selected item as an application of which the notification is provided. When the application of which the notification is provided is configured, the first electronic device 410 may transmit information indicating whether to provide the notification related to the remote control application to the second electronic device 420. The information indicating whether to provide the notification may include identification information about the remote control application of which the notification is configured to be provided (or of which the notification message is configured to be received) and information indicating approval/rejection of reception.

In operation 422, when a notification related to an application corresponding to the remote control application of which the notification is configured to be provided (or of which the notification message is configured to be received) among the plurality of applications installed in the second electronic device 420 occurs, the second electronic device 420 may transmit the notification message to the first electronic device 410.

Upon receiving the notification message, the first electronic device 410 may process the notification message in operation 414. According to an embodiment, the first electronic device 410 may display the notification message on the display. According to another embodiment, the first electronic device 410 may display an object indicating reception of the notification message on the display. For example, the first electronic device 410 may display the object (e.g., a quick view) indicating the reception of the notification message in a designated area (e.g., an upper area) of the display. The quick view object may include content of the notification message. According to another example, the first electronic device 410 may display the object (e.g., a badge) indicating the reception of the notification message to be added to (or overlap) the icon of the remote control application. The badge object may include information about the number of notification messages which the user has not checked among the notification messages.

Figure 5:
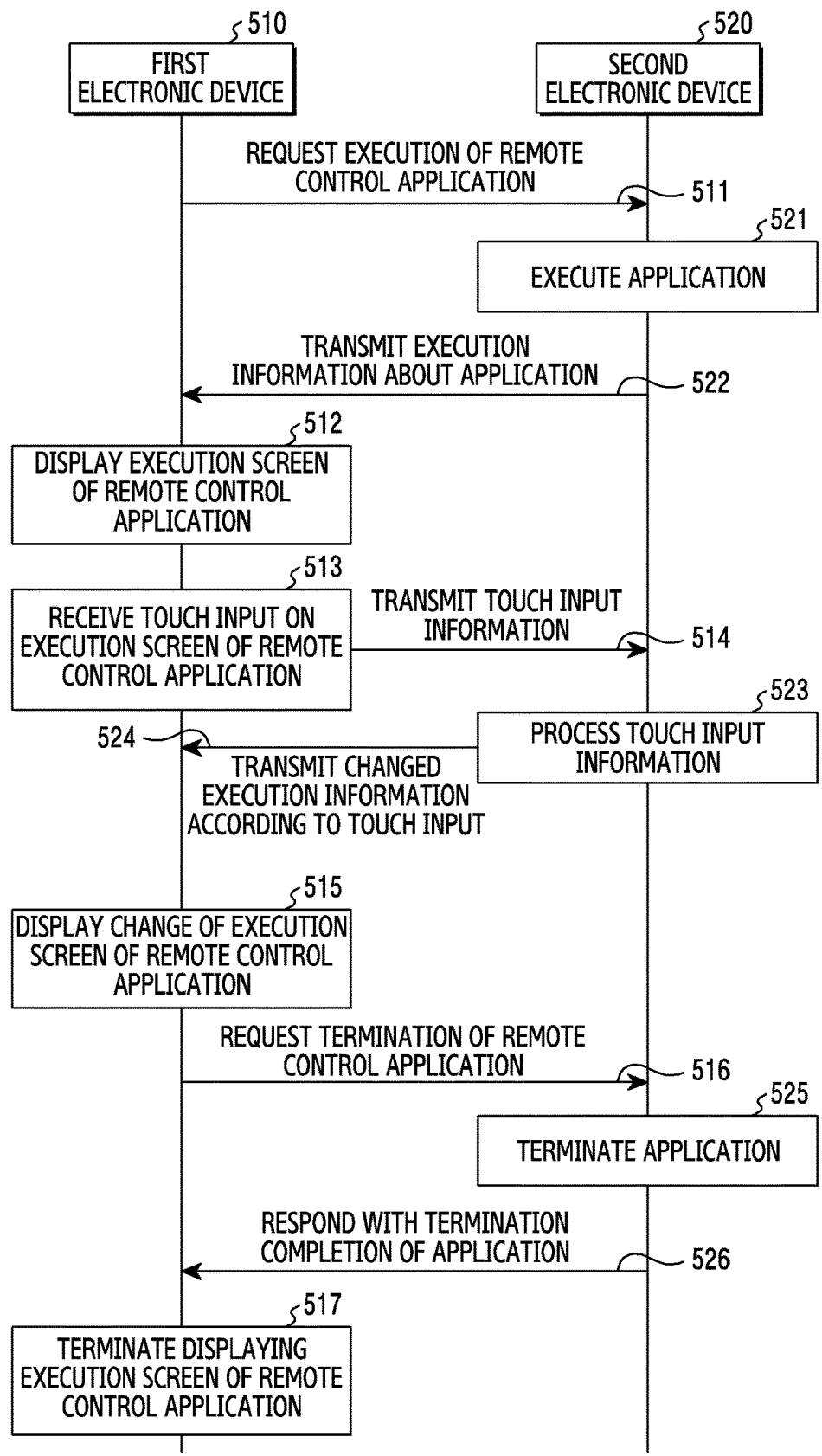
FIG. 5 illustrates a method for controlling an application of an external electronic device according to an example embodiment of the disclosure.

FIG. 5 illustrates a method for controlling an application of an external electronic device according to an embodiment of the disclosure.

Referring to FIG. 5, in operation 511, a first electronic device 510 (e.g., the electronic device 200) may request execution of a remote control application from a second electronic device 520. According to an embodiment, when receiving a user input to select the remote control application displayed on a display (e.g., the display 230), the first electronic device 510 may determine that a request for execution of the remote control application has occurred. Here, the first electronic device 510 may identify an external electronic device (e.g., the second electronic device 520) in which an application corresponding to the remote control application is installed, based on information about the remote control application (e.g., the remote control application information 271) stored in a memory (e.g., the memory 270), and may transmit a request for execution of the application corresponding to the remote control application to the identified external electronic device.

Upon receiving the request for the execution, the second electronic device 520 may identify the application of which the execution has been requested among a plurality of applications installed in the second electronic device 520, and may execute the identified application in operation 521.

In operation 522, the second electronic device 520 may transmit execution information about the executed application to the first electronic device 510. For example, the second electronic device 520 may transmit data about an execution screen of the application to the first electronic device 510.

Upon receiving the execution information about the application, the first electronic device 510 may display an execution screen of the remote control application on the display, based on the execution information about the application in operation 512. According to an embodiment, the first elec- tronic device 510 may change and display the execution screen of the remote control application corresponding to the application according to a graphic property of the display (e.g., the resolution or size of the display), based on the received data about the execution screen of the application.

The first electronic device 510 may receive a touch input on the execution screen of the remote control application in operation 513, and may transmit touch information corresponding to the touch input to the second electronic device 520 in operation 514. According to an embodiment, when a touch input occurs on the display with the execution screen of the remote control application displayed on the display, the first electronic device 510 may transmit touch information corresponding to the touch input to the second electronic device 520 through a communication circuit (e.g., the communication circuit 210). According to an embodiment, the first electronic device 510 may change a touch coordinate included in the touch information, based on a graphic property of a display included in the second electronic device 520 (e.g., the resolution or size of the display included in the second electronic device 520), and may transmit the touch coordinate to the second electronic device 520. For example, the first electronic device 510 may revise the touch input occurring on the display included in the first electronic device 510 as if occurring on the display of the second electronic device 520, thereby transmitting the touch input.

Upon receiving the touch information, the second electronic device 520 may process the touch information corresponding to the received touch input in operation 523, and may transmit changed execution information about the application according to the touch input to the first electronic device 510 in operation 524. According to an embodiment, the second electronic device 520 may change an execution state of the application corresponding to the remote control application, based on the touch information, and may transmit execution information corresponding to the changed execution state to the first electronic device 510. For example, the second electronic device 520 may transmit data about a changed execution screen of the application to the first electronic device 510.

Upon receiving changed execution information about the application, the first electronic device 510 may change the execution screen of the remote control application, based on the changed execution information about the application, and may display the execution screen on the display in operation 515. According to an embodiment, the first electronic device 510 may change and display the execution screen of the remote control application corresponding to the application according to the graphic property of the display (e.g., the resolution or size of the display), based on the data about the changed execution screen of the application.

In operation 516, the first electronic device 510 may request termination of the remote control application from the second electronic device 520. According to an embodiment, the first electronic device 510 may determine whether a request for termination of the remote control application being executed occurs, based on a user input. When the request for the termination occurs, the first electronic device 510 may identify the external electronic device (e.g., the second electronic device 520) in which the application corresponding to the remote control application to be terminated is installed, based on the information about the remote control application (e.g., the remote control application information 271) stored in the memory, and may transmit a request for termination of the application corresponding to the remote control application to the identified external electronic device.

Upon receiving the request for the termination of the application, the second electronic device 520 may terminate the application of which the termination has been request in operation 525. When the application is terminated, the second electronic device 520 may transmit a response indicating that the application has been terminated to the first electronic device 510 in operation 526.

Upon receiving the response, the first electronic device 510 may terminate displaying the execution screen of the remote control application in operation 517. For example, the first electronic device 510 may terminate displaying the execution screen of the remote control application displayed on the display.

As described above, according to various embodiments, a method for controlling an application of an external electronic device by an electronic device (e.g., the electronic device 200) may include receiving information about at least one application installed in the external electronic device from the external electronic device through a communication circuit (e.g., the communication circuit 210) included in the electronic device (e.g., operation 310), configuring, based at least on the received information, the at least one application as a remote control application to be controlled by the electronic device (e.g., operation 330), receiving a notification message related to the remote control application from the external electronic device through the communication circuit (e.g., operation 350), and displaying a first object indicating reception of the notification message on a display (e.g., the display 230) of the electronic device (e.g., operation 370).

According to various embodiments, the method may further include displaying an icon of the remote control application on the display, based at least on the received information.

According to various embodiments, the displaying of the icon of the remote control application may include displaying, on the display, the icon of the remote control application to be distinguished from an icon of an application installed in the electronic device.

According to various embodiments, the displaying of the icon of the remote control application may include displaying, on the display, a second object indicating the remote control application to be added to the icon of the remote control application.

According to various embodiments, the displaying of the first object may include displaying, on the display, the first object to be added to the icon of the remote control application.

According to various embodiments, the configuring of the at least one application as the remote control application may include configuring the at least one application as the remote control application, based at least on a user input received through an input device included in the electronic device.

According to various embodiments, the method may further include transmitting configuration information about the remote control application to the external electronic device through the communication circuit when the remote control application is configured based on the user input.

According to various embodiments, the method may further include transmitting a request for execution of an application corresponding to the remote control application among a plurality of applications installed in the external electronic device to the external electronic device through the communication circuit based on receiving a request for execution of the remote control application.

According to various embodiments, the method may further include receiving data about an execution screen of the application corresponding to the remote control application from the external electronic device through the communication circuit, and displaying the execution screen of the application, based on the received data.

According to various embodiments, the method may further include changing a touch coordinate included in touch information corresponding to a touch input, based at least on a graphic property of a display included in the external electronic device based on the touch input occurring on the display of the electronic device, and transmitting the touch information including the changed touch coordinate to the external electronic device through the communication circuit.

Figure 6:
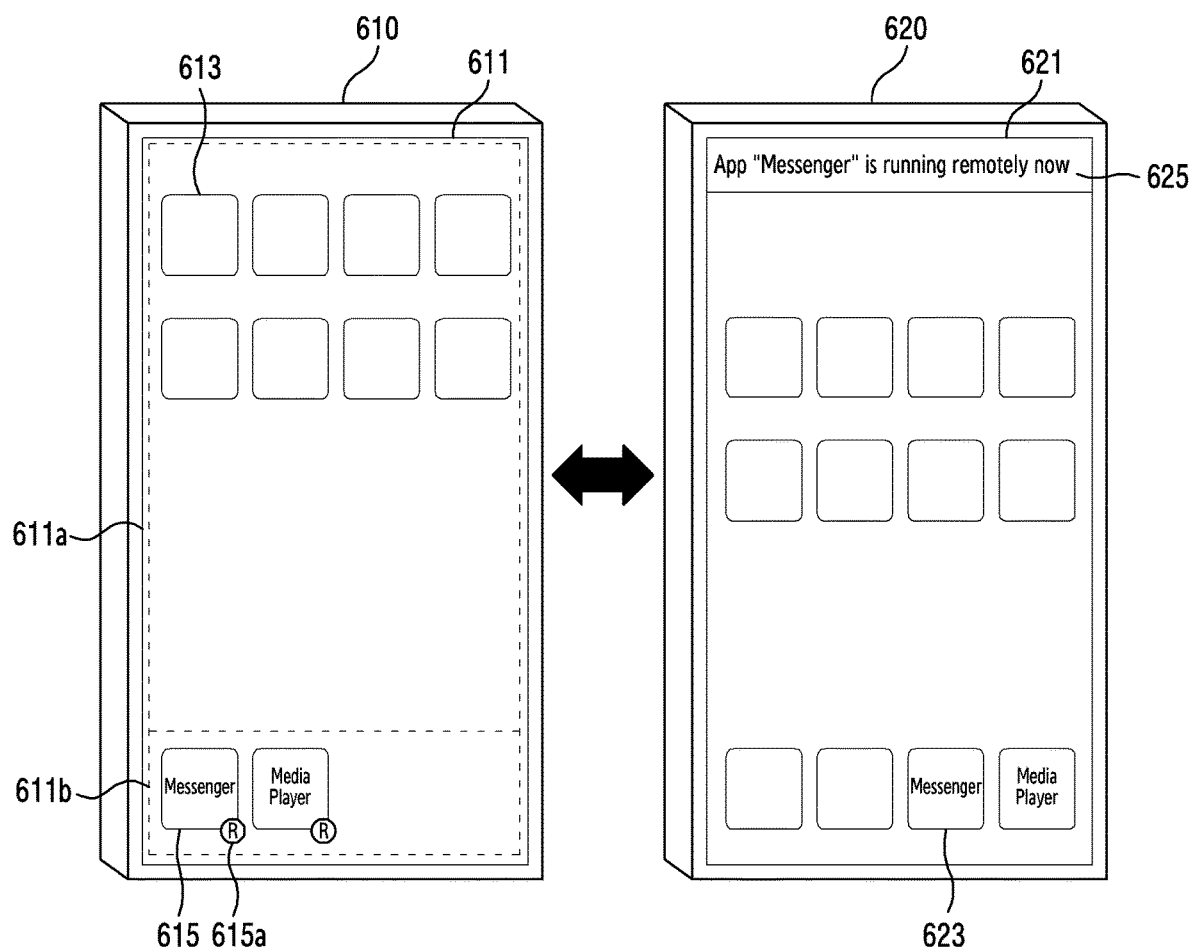
FIG. 6 illustrates a user interface for controlling an application of an external electronic device according to an example embodiment of the disclosure.

FIG. 6 illustrates a user interface for controlling an application of an external electronic device according to an embodiment of the disclosure.

Referring to FIG. 6, a first electronic device 610 (e.g., the electronic device 200) may display an icon of an application remotely controllable by the first electronic device 610 among a plurality of applications installed in a second electronic device 620 on a display 611 (e.g., the display 230). The second electronic device 620 may transmit information about at least one application remotely controllable by the first electronic device 610 among the plurality of applications installed in the second electronic device 620 to the first electronic device 610. Here, the information about the application may include, for example, at least one of identification information (e.g., an application name, package information, or manufacturer information) about the application and an icon (e.g., an icon 623) of the application. The first electronic device 610 may configure a remote control application to be remotely controlled by the first electronic device 610, based on the information about the application, and may display an icon 615 of the remote control application on the display 611.

According to an embodiment, the first electronic device 610 may display the icon 615 of the remote control application to be distinguished from an icon 613 of a different application installed in the first electronic device 610. For example, the first electronic device 610 may divide a screen of the display 611 into an area 611b displaying the icon 615 of the remote control application and an area 611a displaying the icon 613 of the different application installed in the first electronic device 610. In another example, the first electronic device 610 may configure a value indicating a graphic property of the icon 615 of the remote control application to be different from a value indicating a graphic property of the icon 613 of the different application installed in the first electronic device 610. The graphic property may include, for example, at least one of an icon color, a background color, a border shape, a border thickness, or a border color. In still another example, the first electronic device 610 may display an object (e.g., a badge) indicating the remote control application to be added to (or overlap) the icon 615 of the remote control application.

According to an embodiment, the second electronic device 620, on the display 621, may display information 625 indicating that there is an application remotely controlled by the first electronic device 610 among the plurality of applications installed in the second electronic device 620. The information 625 may include, for example, identification information about the remotely controlled application (e.g., an application name, package information, or manufacturer information).

Figure 7A:
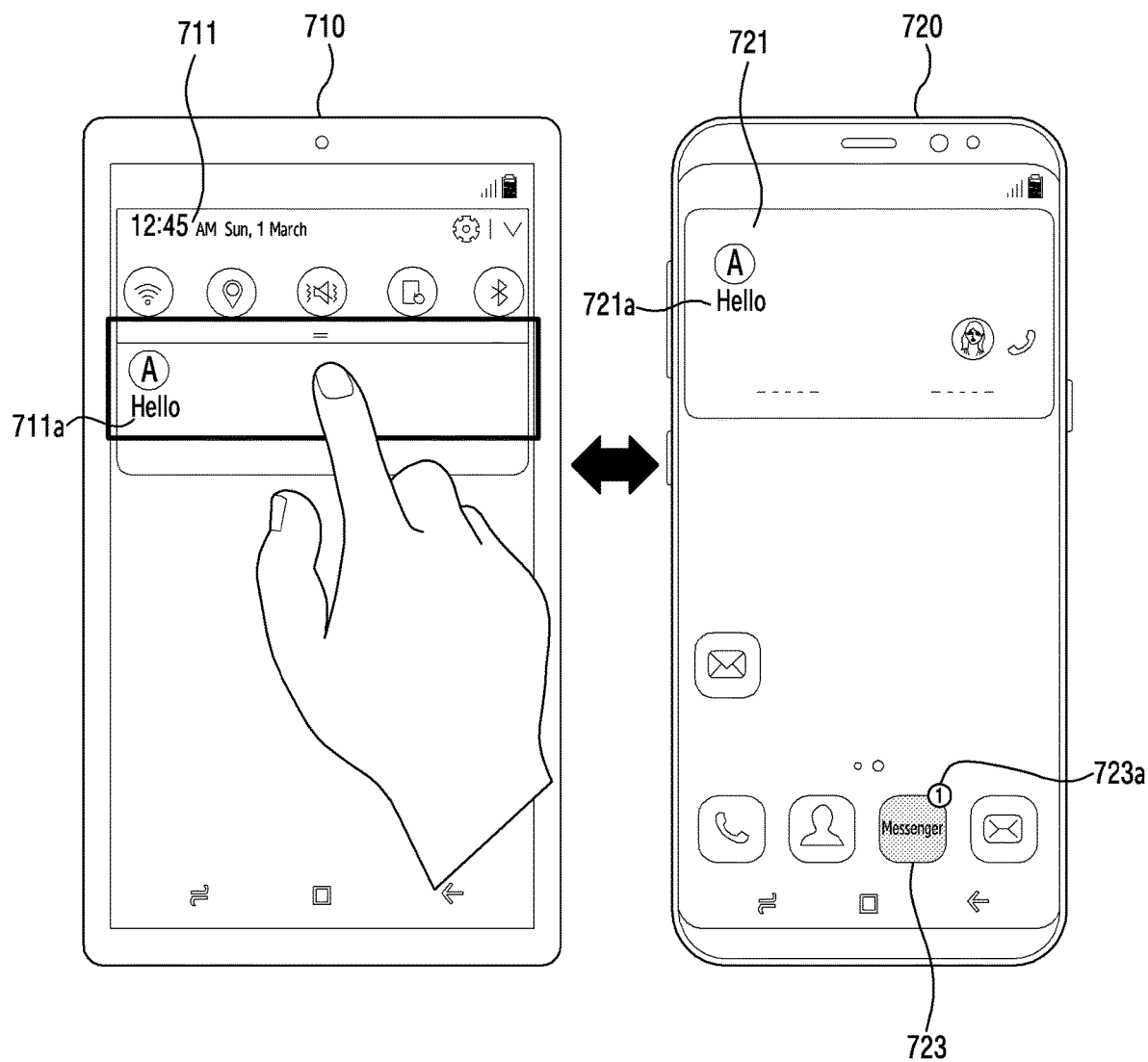
FIG. 7A and FIG. 7B illustrate a user interface for providing a notification related to an application of an external electronic device according to an example embodiment of the disclosure.
Figure 7B:
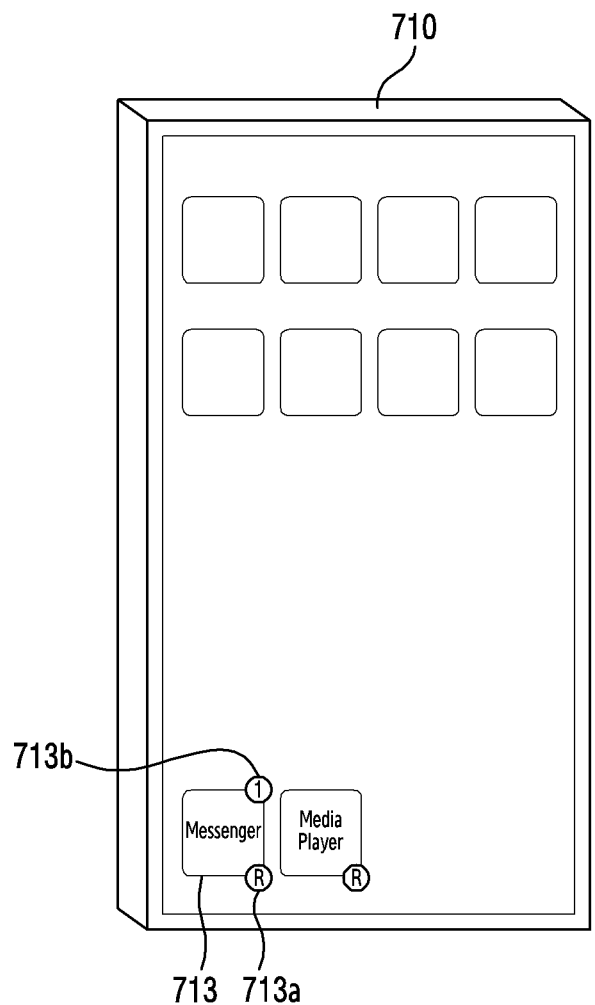

FIG. 7A and FIG. 7B illustrate a user interface for providing a notification related to an application of an external electronic device according to an embodiment of the disclosure.

Referring to FIG. 7A and FIG. 7B, a first electronic device 710 (e.g., the electronic device 200) may provide a notification related to a remote control application. The remote control application may be an application configured to be remotely controlled by the first electronic device 710 among a plurality of applications installed in a second electronic device 720. When the notification related to the remote control application exists, the second electronic device 720 may receive a notification message corresponding to the notification from an external server, and may transmit the notification message on a display of the second electronic device 720. Further, the second electronic device 720 may display a quick view 721 indicating reception of the notification message, and may display a badge 723a indicating the reception of the notification message on an icon 723 of the application. The quick view 721 may include content 721a of the notification message, and the badge 723a may include information about the number of notification messages that a user has not checked among the notification messages.

The second electronic device 720 may transmit the notification message received from the external server to the first electronic device 710. The first electronic device 710 may provide the notification message in a manner the same as or similar to that of the second electronic device 720. For example, the first electronic device 710 may display a quick view 711 indicating reception of the notification message on a predetermined area of a display (e.g., the display 230) of the first electronic device 710. The quick view 711 may include content 711a of the notification message. In another example, the first electronic device 710 may display a badge 713b indicating the reception of the notification message on an icon 713 of the remote control application. The badge 713b may include information about the number of notification messages that the user has not checked among the notification messages.

According to an embodiment, the first electronic device 710 may display the badge 713b to be added to (or overlap) the icon 713 of the remote control application. For example, a badge 713a (first badge) indicating the remote control application may be added to (or overlap) the lower right of the icon 713 of the remote control application, and the badge 713b (second badge) indicating the reception of the notification message may be added to (or overlap) the upper right of the icon 713 of the remote control application. However, positions where the first badge 713a and the second badge 713b are added (or overlap) are not limited thereto. According to various embodiments, each of the first badge 713a and the second badge 713b may be disposed in one area of the upper left, lower left, upper right, or lower right of the icon 713 of the remote control application.

Figure 8A:
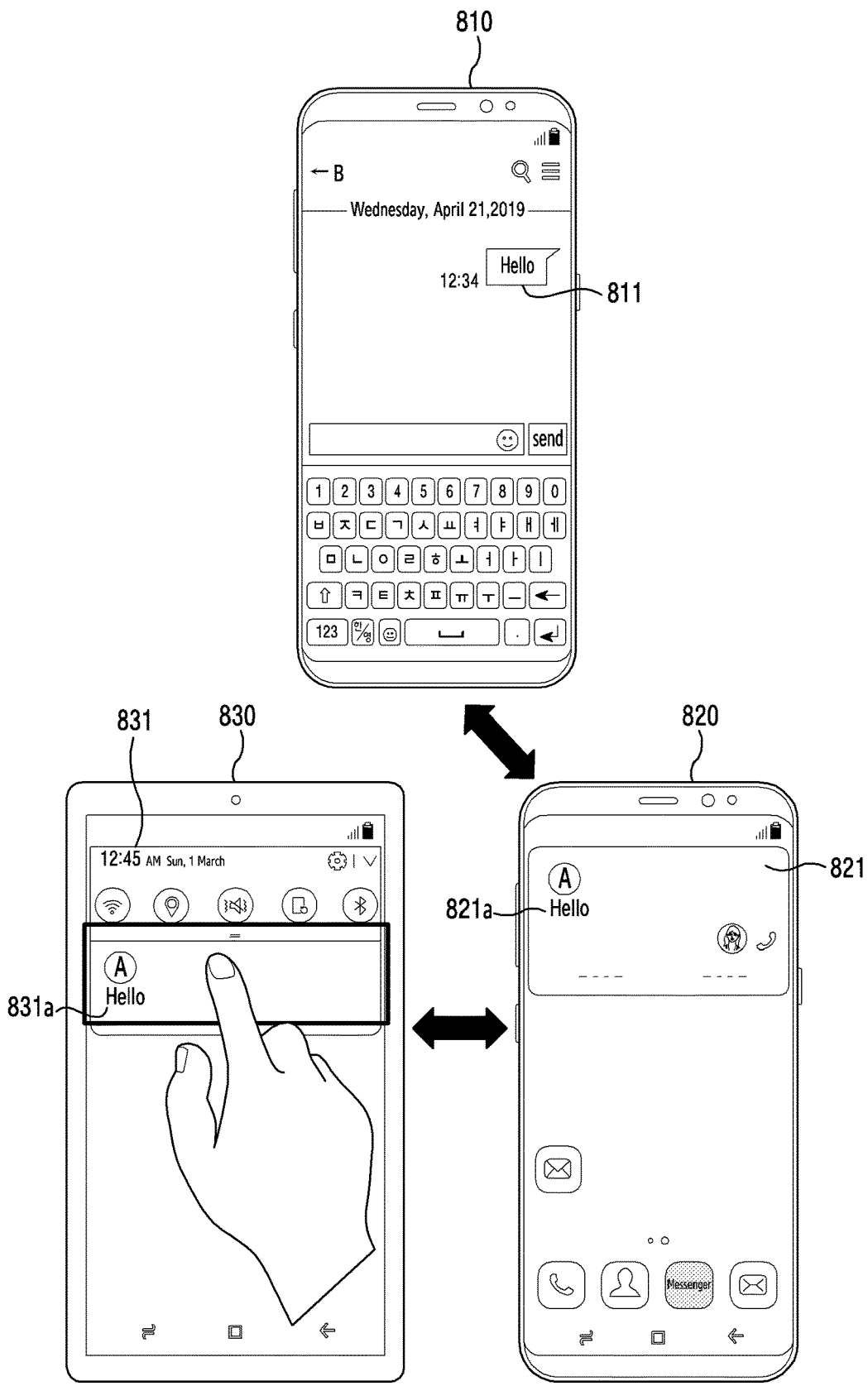
FIG. 8A and FIG. 8B illustrate a method for providing a notification related to an application of an external electronic device in a state in which a security function is not configured according to an example embodiment of the disclosure.
Figure 8B:
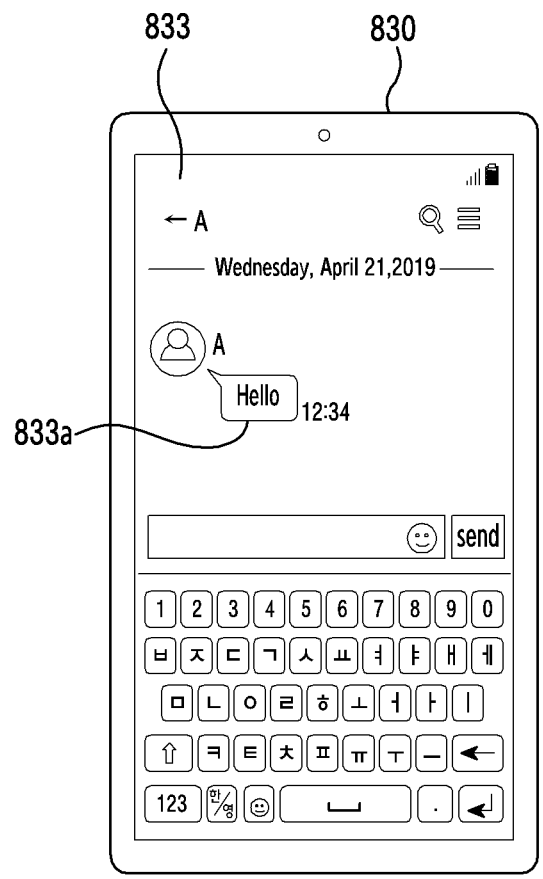

FIG. 8A and FIG. 8B illustrate a method for providing a notification related to an application of an external electronic device in a state in which a security function is not configured according to an embodiment of the disclosure.

Referring to FIG. 8A and FIG. 8B, a first user and a second user may chat through a messenger application. For example, the first user may input a message using a messenger application installed in a first electronic device 810, and content 811 of the input message may be displayed on a display of the first electronic device 810 and may be transmitted to an electronic device used by the second user.

The second user may use a plurality of electronic devices. Here, the plurality of electronic devices (e.g., a second electronic device 820 and a third electronic device 830) may be devices controlled through an account of the second user. Further, any one (e.g., the second electronic device 820) of the plurality of electronic devices may be an electronic device on which the messenger application is installed, and the other one (e.g., the third electronic device 830) may be an electronic device (e.g., the electronic device 200) capable of remotely controlling the messenger application.

Upon receiving the message (e.g., a notification message) from the first electronic device 810 (or via an external server), the second electronic device 820 may display an object indicating reception of the message on a display. For example, the second electronic device 820 may display a quick view 821 indicating the reception of the message. The quick view 821 may include content 821*a* of the message.

The second electronic device 820 may identify whether the application related to the received message is an application corresponding to a remote control application configured in the third electronic device 830. When the application related to the received message is the application corresponding to the remote control application, the second electronic device 820 may transmit the received message to the third electronic device 830.

Upon receiving the message from the second electronic device 820, the third electronic device 830 may display an object indicating reception of the message on a display (e.g., the display 230). For example, the third electronic device 830 may display a quick view 831 indicating the reception of the message. The quick view 831 may include content 831*a* of the message. In another example, the third electronic device 830 may display a badge indicating the reception of the message to be add to (or overlap) an icon of the remote control application.

When the object (e.g., quick view 831) indicating the reception of the message is selected, the third electronic device 830 may displays an execution screen 833 of the remote control application (e.g., the messenger application) on the display. Further, the third electronic device 830 may display content 833*a* of the received message on the execution screen 833 of the remote control application.

Figure 9A:
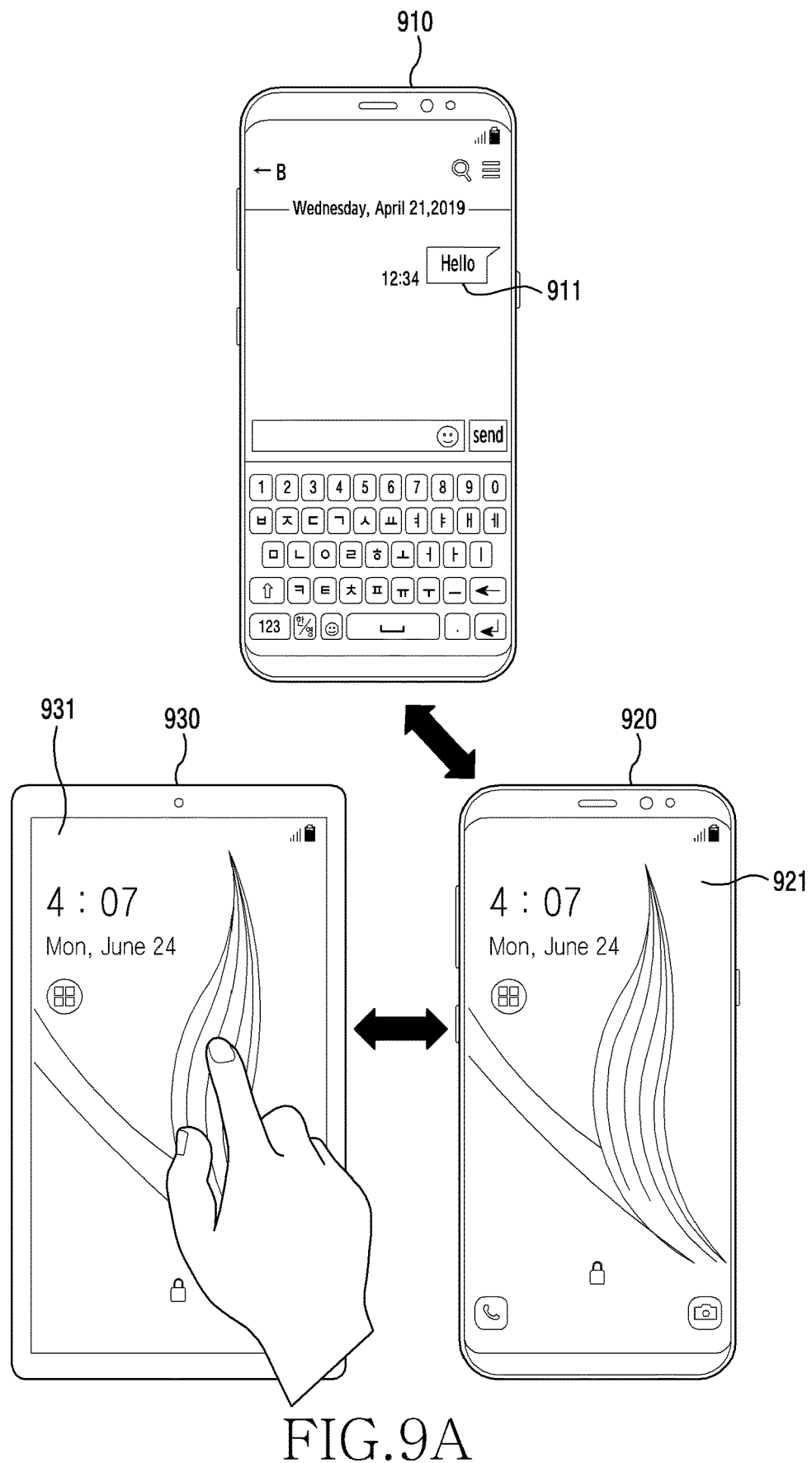
FIG. 9A and FIG. 9B illustrate a method for providing a notification related to an application of an external electronic device in a state in which a security function is configured according to an example embodiment of the disclosure.
Figure 9B:
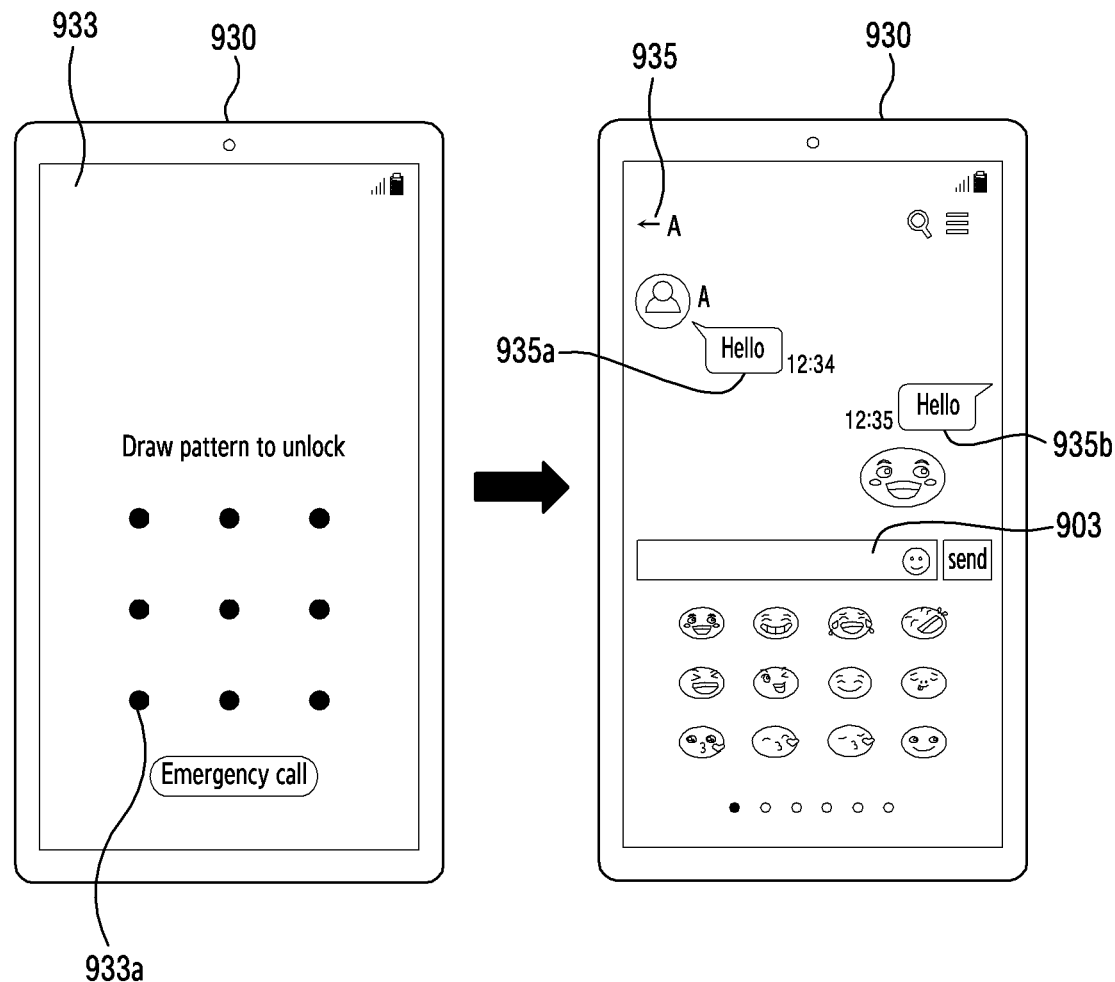

FIG. 9A and FIG. 9B illustrate a method for providing a notification related to an application of an external electronic device in a state in which a security function is configured according to an embodiment of the disclosure. FIG. 9A and FIG. 9B illustrate a case where the security function is configured in an electronic device receiving a message (e.g., a notification message).

Referring to FIG. 9A and FIG. 9B, a first user and a second user may chat through a messenger application. For example, the first user may input a message using a messenger application installed in a first electronic device 910, and content 911 of the input message may be displayed on a display of the first electronic device 910 and may be transmitted to an electronic device used by the second user.

The second user may use a plurality of electronic devices. Here, the plurality of electronic devices (e.g., a second electronic device 920 and a third electronic device 930) may be devices controlled through an account of the second user. Further, any one (e.g., the second electronic device 920) of the plurality of electronic devices may be an electronic device on which the messenger application is installed, and the other one (e.g., the third electronic device 930) may be an electronic device (e.g., the electronic device 200) capable of remotely controlling the messenger application. The electronic device on which the messenger application is installed may be an electronic device in which a security function is configured. For example, the second electronic device 920 may be an electronic device in which a screen lock function is configured or an electronic device in which a security function for user identification when a remote control application is executed (or used) is configured.

Upon receiving the message from the first electronic device 910 (or via an external server), the second electronic device 920 may display an object indicating reception of the message on a display. For example, the second electronic device 920 may display a quick view indicating the reception of the message. The quick view may include content of the message. The quick view may be displayed for a specified time and may then be closed when the screen lock function is configured in the second electronic device 920, for example, in a state of displaying a lock screen 921 or when the second electronic device 920 is in a sleep state with a screen turned off.

The second electronic device 920 may identify whether the application related to the received message is an application corresponding to a remote control application configured in the third electronic device 930. When the application related to the received message is the application corresponding to the remote control application, the second electronic device 920 may transmit the received message to the third electronic device 930.

Upon receiving the message from the second electronic device 920, the third electronic device 930 may display an object indicating reception of the message on a display (e.g., the display 230). For example, the third electronic device 930 may display a quick view indicating the reception of the message. The quick view may include content of the message. The quick view may be displayed for a specified time and may then be closed when the screen lock function is configured in the second electronic device 920 transmitting the message, for example, in a state of displaying a lock screen 931 on the display or when the second electronic device 920 is in a sleep state with the screen turned off. In another example, the third electronic device 930 may display a badge indicating the reception of the message to be add to (or overlap) an icon of the remote control application. In still another example, even in a case where the screen lock function is configured in the second electronic device 920, when the remote control application is executed, the third electronic device 930 may receive data related to a screen for through authentication information (e.g., a pattern or a password) for user identification from the second electronic device 920, and may display the data on the display of the third electronic device 930. According to an embodiment, the third electronic device 930 may receive the data related to the screen for inputting the authentication information from the second electronic device 920 through screen mirroring.

When the user inputs a designated gesture (or touch) on the screen of the third electronic device 930 or selects (e.g., touches) the icon of a remote control application displayed on the screen to identify the message, the third electronic device 930 may display a lock screen 933 configured in the second electronic device 920 on the display of the third electronic device 930. Alternatively, when the type of lock configured in the second electronic device 920 is lock using biometric information, such as a user's fingerprint or iris, the second electronic device 920 may transmit data related to an alternative lock screen 933 for inputting alternative authentication information (e.g., a pattern or password) additionally input by the user when configuring the lock using the biometric information to the third electronic device 930, and the third electronic device 930 may display the lock screen 933 on the display of the third electronic device 930, based on the received data. According to an embodiment, the third electronic device 930 may receive the lock screen 933 from the second electronic device 920 through screen mirroring, and may display the lock screen 933 on the display. The lock screen 933 may be, for example, a screen for inputting a pattern 933a or a password.

When the lock is released through the lock screen 933 (when a lock release pattern configured by the user is input), the third electronic device 930 may display an execution screen 935 of the remote control application (e.g., the messenger application) on the display. Further, the third electronic device 930 may display content 935a of the received message on the execution screen 935 of the remote control application. The execution screen 935 of the remote control application may include an input area 903 (e.g., an input window) for inputting a message. Accordingly, when the user inputs a message through the input area 903, the third electronic device 930 may display content 935b of the input message on the execution screen 935 of the remote control application. The content 935b of the input message may be transmitted to the second electronic device 920. In this case, the second electronic device 920 may transmit the content 935b of the message received from the third electronic device 930 to the first electronic device 910 through the external server. In an embodiment, the third electronic device 930 may transmit the content 935b of the input message to the first electronic device 910 through the external server.

Each embodiment herein may be used in combination with any other embodiment herein.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 and/or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
 a display;

a communication circuit;
a processor configured to be operatively connected to the display and the communication circuit; and
a memory configured to be operatively connected to the processor,
wherein the memory stores instructions which are configured to, when executed, cause the processor to:
request from an external electronic device information about at least one application installed on the external electronic device;
receive, from the external electronic device through the communication circuit, the information about the at least one application installed in the external electronic device;
configure, based at least on the received information, the at least one application as a remote control application to be controlled by the electronic device without requiring the electronic device to execute a remote control program at the electronic device;
receive, from the external electronic device through the communication circuit, a notification message related to the remote control application; and
control to display a first object indicating reception of the notification message from the external electronic device on the display without requiring the electronic device to execute the remote control program at the electronic device.

2. The electronic device of claim 1, wherein the instructions are configured to cause the processor to control to display an icon of the remote control application on the display, based at least on the received information.

3. The electronic device of claim 2, wherein the instructions are configured to cause the processor to control to display, on the display, the icon of the remote control application to be distinguished from an icon of an application installed in the electronic device.

4. The electronic device of claim 2, wherein the instructions are configured to cause the processor to control to display, on the display, a second object indicating the remote control application to be added to the icon of the remote control application.

5. The electronic device of claim 2, wherein the instructions are configured to cause the processor to control to display, on the display, the first object to be added to the icon of the remote control application.

6. The electronic device of claim 1, further comprising an input device comprising input circuitry,
wherein the instructions are configured to cause the processor to configure the at least one application as the remote control application, based at least on a user input received through the input device.

7. The electronic device of claim 6, wherein the instructions are configured to cause the processor to control to transmit configuration information about the remote control application to the external electronic device through the communication circuit when the remote control application is configured based on the user input.

8. The electronic device of claim 1, wherein the instructions are configured to cause the processor to control to transmit a request for execution of an application corresponding to the remote control application among a plurality of applications installed in the external electronic device to the external electronic device through the communication circuit based on at least receiving a request for execution of the remote control application.

9. The electronic device of claim 8, wherein the instructions are configured to cause the processor to:

receive data about an execution screen of the application corresponding to the remote control application from the external electronic device through the communication circuit, and
control to display the execution screen of the application, based on the received data.

10. The electronic device of claim 9, wherein the instructions are configured to cause the processor to:
change a touch coordinate included in touch information corresponding to a touch input, based at least on a graphic property of a display included in the external electronic device when the touch input occurs on the display of the electronic device, and
control to transmit the touch information comprising the changed touch coordinate to the external electronic device through the communication circuit.

11. A method for controlling an application of an external electronic device by an electronic device, the method comprising electronic device:
requesting from an external electronic device information about at least one application installed on the external electronic device;
receiving, from the external electronic device through the communication circuit, the information about the at least one application installed in the external electronic device;
configuring, based at least on the received information, the at least one application as a remote control application to be controlled by the electronic device without requiring the electronic device to execute a remote control program at the electronic device;
receiving, from the external electronic device through the communication circuit, a notification message related to the remote control application; and
displaying a first object indicating reception of the notification message from the external electronic device without requiring the electronic device to execute a remote control program at the electronic device.

12. The method of claim 11, wherein the displaying of the first object comprises displaying, on the display, the first object to be added to an icon of the remote control application.

13. The method of claim 11, further comprising transmitting a request for execution of an application corresponding to the remote control application among a plurality of applications installed in the external electronic device to the external electronic device through the communication circuit based on receiving a request for execution of the remote control application.

14. The method of claim 13, further comprising:
receiving data about an execution screen of the application corresponding to the remote control application from the external electronic device through the communication circuit; and
displaying the execution screen of the application, based on the received data.

15. The method of claim 14, further comprising:
changing a touch coordinate included in touch information corresponding to a touch input, based at least on a graphic property of a display included in the external electronic device based on the touch input occurring on the display of the electronic device; and
transmitting the touch information comprising the changed touch coordinate to the external electronic device through the communication circuit.

16. The method of claim 11, wherein the configuring of the at least one application as the remote control application comprises configuring the at least one application as the remote control application, based at least on a user input received through an input device included in the electronic device.

17. The method of claim 16, further comprising:
transmitting configuration information about the remote control application to the external electronic device through the communication circuit when the remote control application is configured based on the user input.

18. The method of claim 17, further comprising:
displaying an icon of the remote control application on the display, based at least on the received information.

19. The method of claim 18, further comprising:
displaying the icon of the remote control application to be distinguished from an icon of an application installed in the electronic device.

20. The method of claim 19, further comprising:
displaying a second object indicating the remote control application to be added to the icon of the remote control application.

\* \* \* \* \*